US007553562B2

(12) United States Patent
Otsuka

(10) Patent No.: US 7,553,562 B2
(45) Date of Patent: Jun. 30, 2009

(54) COMPOSITE-TYPE MAGNETIC CORE AND METHOD OF MANUFACTURING THE SAME

(75) Inventor: Tsutomu Otsuka, Tokyo (JP)

(73) Assignee: Sumida Corporation, Tokyo (JP)

( * ) Notice: Subject to any disclaimer, the term of this patent is extended or adjusted under 35 U.S.C. 154(b) by 470 days.

(21) Appl. No.: 11/372,891

(22) Filed: Mar. 10, 2006

(65) Prior Publication Data

US 2006/0210832 A1 Sep. 21, 2006

(30) Foreign Application Priority Data

Mar. 17, 2005 (JP) ............................ 2005-076669

(51) Int. Cl.
*B32B 15/00* (2006.01)

(52) U.S. Cl. .................................................. 428/692.1

(58) Field of Classification Search .............. 428/411.1, 428/688, 689, 692.1, 704, 697, 699, 702, 428/457, 469, 472, 693.1; 377/101; 148/100, 148/101, 104, 105, 272, 277, 279, 33.6, 300, 148/302, 304, 403, 330

See application file for complete search history.

(56) References Cited

U.S. PATENT DOCUMENTS

| | | | | |
|---|---|---|---|---|
| 3,583,887 | A | 6/1971 | Steger et al. | |
| 4,025,379 | A * | 5/1977 | Whetstone | 29/609 |
| 4,369,076 | A | 1/1983 | Miyahara et al. | |
| 5,352,522 | A | 10/1994 | Kugimiya et al. | |
| 2005/0181202 | A1 * | 8/2005 | Kaneko et al. | 428/336 |
| 2005/0236071 | A1 * | 10/2005 | Koshiba et al. | 148/304 |

FOREIGN PATENT DOCUMENTS

| | | | |
|---|---|---|---|
| EP | 1 150 311 | A2 | 10/2001 |
| JP | 11-310882 | | 11/1999 |
| JP | 2002-164208 | | 6/2002 |
| JP | 2003-318014 | | 11/2003 |

* cited by examiner

*Primary Examiner*—Holly Rickman
*Assistant Examiner*—Lisa Chau
(74) *Attorney, Agent, or Firm*—Alston & Bird LLP

(57) ABSTRACT

Present inventions relate to a composite-type magnetic core and a method of manufacturing same. The composite-type magnetic core is made of a soft magnetic metal powder and an insulating binder having a lower electrical conductivity than the soft magnetic metal powder. The composite-type magnetic core has 10 parts per million (ppm) or more but 500 ppm or less of sodium oxide and 50 ppm or more but 3000 ppm or less of boron oxide. The sodium oxide and the boron oxide are concentrated in an inner layer near the surface of the magnetic core.

5 Claims, 2 Drawing Sheets

COMPOSITE-TYPE MAGNETIC CORE AND METHOD OF MANUFACTURING THE SAME

CROSS-REFERENCE TO RELATED APPLICATION

This application claims priority from Japanese Patent Application No. 2005-076669 filed on Mar. 17, 2005, the contents of which are hereby incorporated by reference herein.

FIELD OF THE INVENTION

The present invention relates to a composite-type magnetic core containing soft magnetic metal powder and an insulating binder, and a method of manufacturing a composite-type magnetic core.

BACKGROUND OF THE INVENTION

As electronic devices become more powerful and more compact, requirements have grown for compact, high-performance transformers, choke coils, filters and the like. Moreover, there is a trend toward the use of larger electrical currents. Up to now, ferrite has been the most commonly used low-cost magnetic material. However, a disadvantage of ferrite is that it has a low saturation magnetic flux density, and is thus unable to cope with ever larger electric currents.

By contrast, soft magnetic metal powder has a higher saturation magnetic flux density than ferrite and can thus accommodate large currents. However, it has not only low electrical resistance and large eddy current loss but also poor resistance to oxidation because iron is its main component. In order to overcome these disadvantages, a composite-type magnetic core has been developed, as disclosed, for example, in Japanese Laid-Open Patent Publication No. 2003-318014.

In order to give the above-described composite-type magnetic core itself high oxidation-resistant properties, a coating method is employed in which the magnetic core is coated with a resin such as an epoxy resin or a fluorocarbon resin. However, if the thickness of the resin coating is too thin, the magnetic core will have insufficient oxidation resistance. On the other hand, increasing the thickness of the coating layer increases the size of the magnetic core, which makes it difficult to satisfy the demand for greater compactness. Where a combination of E-type magnetic cores are used, covering the surfaces of the E-type magnetic cores where they join with organic material widens the magnetic gap, which reduces inductance and also leads to unevenness in inductance caused by inconsistencies in the thickness of the organic material coating.

In order to eliminate such deficiencies there exists a method involving masking the contact surfaces and coating the remaining surfaces with resin. However, such a method causes a decrease in the oxidation resistance of the contact surfaces.

SUMMARY OF THE INVENTION

Accordingly, the present invention is conceived as a solution to the above-described problems of the conventional art, and has as an object to provide a composite-type magnetic core and a method of manufacturing same that fully satisfies the demands for high oxidation resistance and greater compactness.

To achieve the above-described object, according to a first aspect of the present invention a composite-type magnetic core comprises:

soft magnetic metal powder; and an insulating binder having a lower electrical conductivity than such soft magnetic metal powder, the composite-type magnetic core comprising 10 parts per million (ppm) or more but 500 ppm or less of sodium oxide and 50 ppm or more but 3000 ppm or less of boron oxide, the sodium oxide and the boron oxide concentrated in an inner layer near the surface of the magnetic core.

According to the first aspect of the present invention described above, the oxidation resistance of the composite-type magnetic core can be improved dramatically. In addition, because the sodium oxide and the boron oxide are present not only on the surface of the magnetic core but also in an inner layer near the surface of the magnetic core, the coating layer on the surface of the magnetic core is no thicker than the conventional case in which the magnetic core is coated with resin, enabling the magnetic core to be made more compact.

There are several reasons for maintaining the concentration of sodium oxide at between 10 ppm and 500 ppm inclusive, and that of boron oxide at between 50 ppm and 3000 ppm inclusive. For one, adequate oxidation resistance cannot be obtained at concentrations of sodium oxide of less than 10 ppm and of boron oxide of less than 50 ppm. In addition, at concentrations of sodium oxide above 500 ppm and of boron oxide above 3000 ppm, the sodium oxide and boron oxide bleed from the surface of the magnetic core and peel off easily, which not only degrades the appearance and the oxidation resistance of the magnetic core but also causes the magnetic properties of the magnetic core to deteriorate.

In addition, according to a second aspect of the present invention, the soft magnetic metal powder contains 500 ppm or less of carbon.

According to the second aspect of the present invention described above, the use of soft magnetic metal powder containing a concentration of carbon of 500 ppm or less enables the oxidation resistance of the composite-type magnetic core to be further improved.

In addition, according to a third aspect of the present invention, a method of manufacturing a composite-type magnetic core comprises the steps of:

molding a mixture of soft magnetic metal powder and an insulating binder having a lower electrical conductivity than such soft magnetic metal powder;

hardening the molded body;

contacting the hardened body with a solution containing an inorganic compound including boron and sodium; and heating the body having boron and sodium to a temperature of at least 80° C. but not more than 250° C.

The third aspect of the present invention described above can provide a composite-type magnetic core with superior oxidation resistance, and capable of accommodating efforts to make the magnetic core more compact. In particular, contacting the hardened body with a solution containing an inorganic compound including boron and sodium facilitates concentrating the boron oxide and the sodium oxide in an inner layer near the surface of the magnetic core, thus making it possible to obtain a composite-type magnetic core with the superior properties described above at low cost.

There are several reasons for maintaining the heating temperature at 80° C. or higher but 250° C. or lower. For one, if the heat treatment temperature is lower than 80° C., it will be difficult to attain a state in which the sodium oxide and the boron oxide to produce an oxidation-resistant effect. In addition, if the heat treatment temperature is higher than 250° C., reactants composed of sodium oxide and boron oxide peel off from the magnetic core due to differences in the coefficient of thermal expansion of the sodium oxide and the boron oxide on the one hand and the soft magnetic metal powder on the other, adversely affecting oxidation resistance.

As described above, the present invention makes it possible to provide a composite-type magnetic core with superior oxidation resistance and fully capable of accommodating demands for greater compactness.

Other features, objects and advantages of the present invention will be apparent from the following description when taken in conjunction with the accompanying drawings, in which like reference characters designate the same or similar parts throughout the figures thereof.

BRIEF DESCRIPTION OF THE SEVERAL VIEWS OF THE DRAWINGS

FIGS. 2A, 2B and 2C are diagrams showing schematically a state of a target object manufactured in particular steps in the manufacturing process shown in FIG. 1, in which FIG. 2A shows a state of the compound fusing soft magnetic metal powder and an insulating binder, FIG. 2B shows a plan view (left) and lateral cross-sectional view (right) of the compound molded to the shape of a cylindrical core, and FIG. 2C shows a composite-type magnetic core having an oxidized layer that contains boron oxide and sodium oxide.

DETAILED DESCRIPTION OF THE INVENTION

Hereinafter preferred embodiments of the present invention are described with reference to the accompanying drawings in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A description is first given of a method of manufacturing the composite-type magnetic core of the present invention.

A. Method of Manufacture

Figure 1:
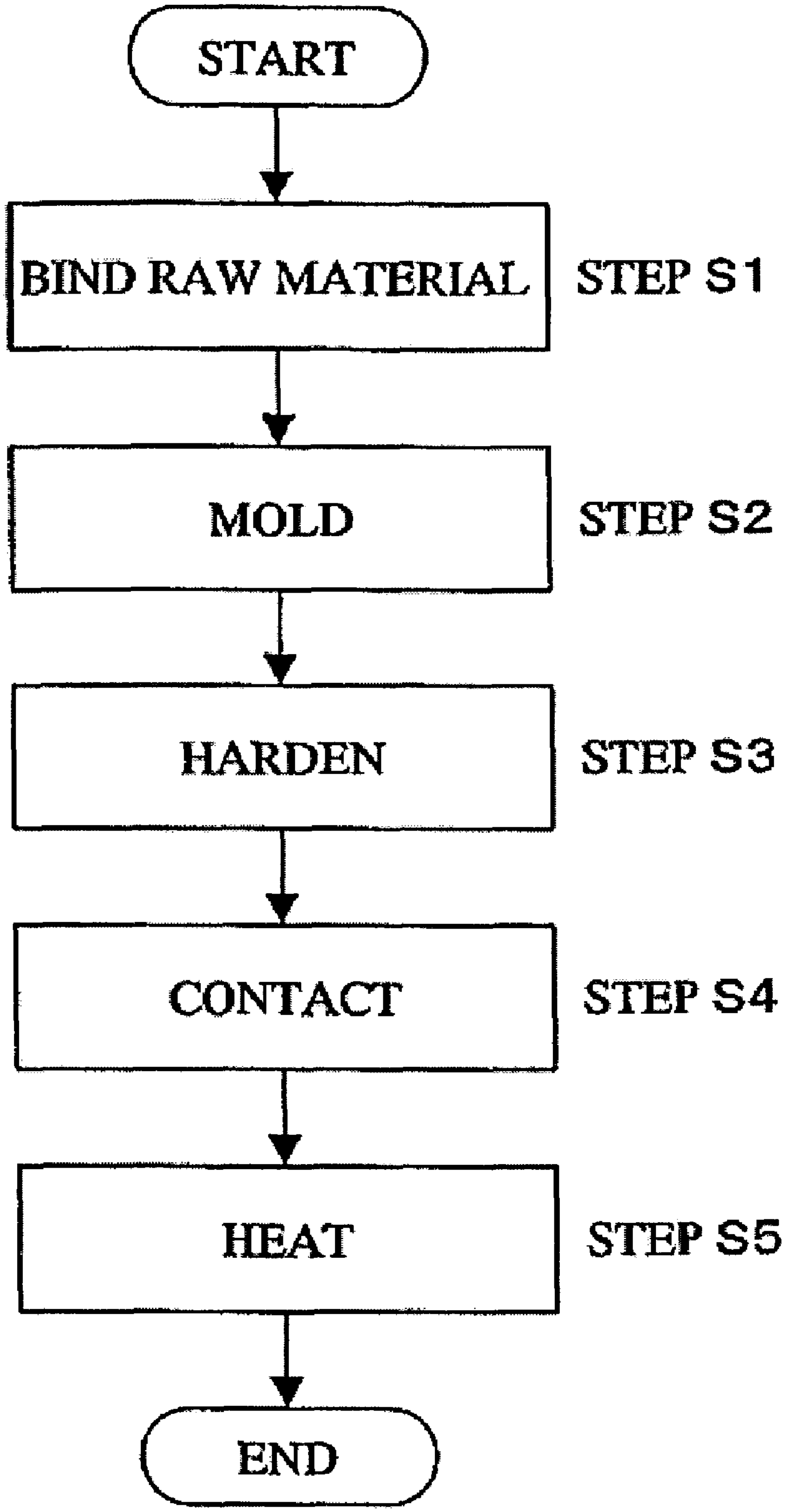
FIG. 1 is a flow chart illustrating steps in the manufacture of a composite-type magnetic core according to an embodiment of the present invention.
Figure 2A:
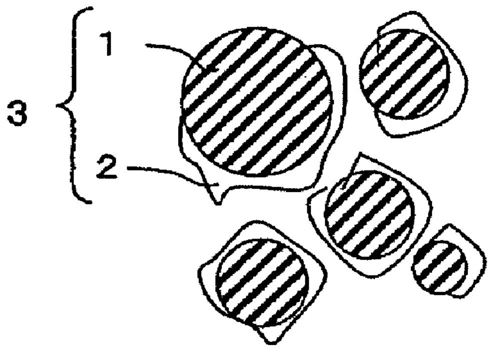
Figure 2B:
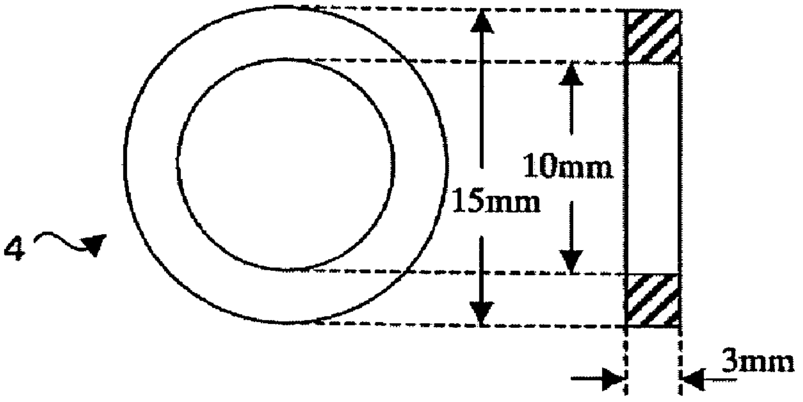
Figure 2C:
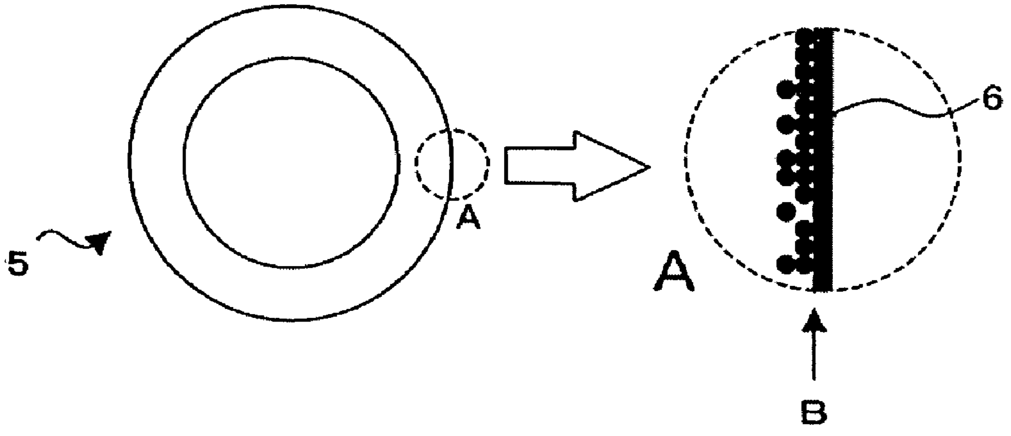

FIG. 1 is a flow chart illustrating steps in the manufacture of a composite-type magnetic core according to an embodiment of the present invention. FIGS. 2A, 2B and 2C are diagrams showing schematically a state of a target object manufactured in particular steps in the manufacturing process shown in FIG. 1.

The composite-type magnetic core according to one embodiment of the present invention is manufactured through a process involving a raw material fusing step (step S1) of fusing a soft magnetic metal powder 1 and an insulating binder 2 having a lower electrical conductivity than such soft magnetic metal powder 1; a molding step (step S2) of molding the raw material powder 3 after fusion; a hardening step (step S3) of hardening the molded body 4; a contacting step (step S4) of contacting the molded body 4 with sodium component and boron component; and then a heating step (step S5).

An exemplary detailed description is given below of each of the steps described above.

(Raw Material's Binding Step: S1)

The soft magnetic metal powder 1 is fluidized by a gas jet and the insulating binder 2 is sprayed to the fluidizing magnetic metal powder 1. As a result, as shown in FIG. 2A, the insulating binder 2 is attached to the surface of the soft magnetic metal powder 1. Preferred embodiments of the soft magnetic metal powder 1 are powders of a Fe—Si—Al alloy Fe—Al alloy Sendust, a permalloy such as Fe—Ni alloy, a Fe—Si alloy or the like. A preferred embodiment of the insulating binder 2 is a thermosetting resin such as an epoxy resin or a phenol resin. Further, a material other than a thermosetting resin may be used for the insulating binder 2. For example, a thermoplastic resin may be used for the insulating binder 2.

(Molding Step: S2)

This step involves pressure-molding the soft magnetic metal powder 1 coated with the insulating binder 2. A variety of molding methods may be used as the molding method, such as die molding, injection molding, and the like. The molded body 4 may be given to the cylindrical core having an external diameter of 15 mm, an internal diameter of 10 mm and a height of 3 mm (called a toroidal core) as shown in FIG. 2B and may also be given to an E-shaped form. The molded body 4 may be applied to the compressed powder element where an air-core wound coil is molded as an integral part of the interior of the composite-type magnetic core.

(Hardening Step: S3)

By applying heat to the molded body 4, the insulating binder 2 is hardening and then the soft magnetic metal powder 1 is securely held. Temperature for hardening should be sufficient to affix the insulating binder 2 securely to the soft magnetic metal powder 1. For example, in the case that an epoxy resin is used as the insulating binder 2, the optimum temperature is approximately 150° C.

(Contacting Step: S4)

The molded body 4 is placed inside a container holding a solution containing sodium and boron and the container is decompressed. The molded body 4 is immersed in the solution containing sodium and boron (hereinafter, called "solution containing an inorganic compound"). Multiple open pores are present in the molded body 4, and accordingly, when the molded body 4 of such a construction is placed in a solution containing an inorganic compound and the container is decompressed, the open pore areas are forcibly exhausted to the outside of the solution and the solution containing an inorganic compound enters the pores. Multiple solutions containing inorganic compounds of different concentrations of sodium and boron are prepared and multiple molded bodies 4 are immersed in each of the solutions.

(Heating Step: S5)

The molded body 4 is removed from the solution containing an inorganic compound and then heated to a predetermined temperature in the range of 80-250° C. The solution containing an inorganic compound present inside the open pores in the molded body 4 contains boron and sodium. After the solvent has been volatilized by heating, oxide of boron and oxide of sodium remain inside the open pores. These oxides oxidize before the soft magnetic metal powder 1 does in this manufacturing process, thus enabling a composite-type magnetic core 5 to be manufactured with a core covered with an oxidized layer 6 composed of boron oxide and sodium oxide such as that shown in FIG. 2C, without actually oxidizing the soft magnetic metal powder 1 itself. As shown in the expanded view of a portion A shown in FIG. 2C, this oxidized layer 6 is concentrated in a layer near the surface of the magnetic core as well as thinly on the surface of the magnetic core. A portion indicated by arrow B shown in FIG. 2C is the boundary between a base material and the coating layer of the surface of the composite-type magnetic core 5. As can be understood from FIG. 2C, the oxidized layer 6 concentrated on the surface of the composite-type magnetic core 5 and in an inner layer near the surface of the composite-type magnetic core 5 functions as an oxidation prevention barrier for the base material composed of the soft magnetic metal powder 1.

B. Method of Evaluation

A description is given of various methods of evaluating the properties of the composite-type magnetic core manufactured according to the manufacturing method described above.

(1) Oxidation Resistance Test

The composite-type magnetic core 5 obtained as described above is subjected to an oxidation resistance test in which the magnetic core is immersed for 500 hours in a thermo-hygrostat at 60° C. and 95% relative humidity. In addition to evaluation by visual inspection, an evaluation method may be used that evaluates the extent of oxidation, if any, by taking a photograph and performing image analysis to accurately quantify the extent of the oxidized surface area.

(2) Microanalysis

In addition, the concentration of sodium and boron in the composite-type magnetic core 5 may be determined by Inductively Coupled Plasma (ICP) spectrometry.

Where the boron oxide is present in concentrations of 50-3000 ppm and the sodium oxide is present in concentrations of 10-500 ppm, the synergistic effect of the boron oxide and the sodium oxide enables the oxidation resistance of the composite-type magnetic core 5 to be greatly improved. However, if only one or the other of the boron oxide and the sodium oxide is within the foregoing ranges, rust can be observed over approximately 50% of the surface area of the composite-type magnetic core 5, which cannot be deemed to be adequately oxidation-resistant.

In addition, where both the boron oxide and the sodium oxide are within the foregoing ranges, even in the case that the concentration of carbon is greater than 500 ppm, only less than 10% of the surface area of the composite-type magnetic core 5 rusts. In this evaluation, a state in which 10% of the surface area of the composite-type magnetic core 5 is rusted is considered the maximum permissible oxidation resistance. Therefore, it appears that the range of concentration of boron oxide and sodium oxide is very important. In addition, where the condition that the concentration of carbon be 500 ppm or less is satisfied, greater oxidation resistance is found.

A description of specific illustrative embodiments of the present invention is given below.

EXAMPLE 1

(1) Raw Material

For the soft magnetic metal powder 1 and the insulating binder 2, respectively, a 3-percent Si—Fe alloy powder (that is, an alloy powder composed of 97% by weight Fe and 3% by weight Si) and an epoxy resin were used. The 3-percent Si—Fe alloy powder had a carbon concentration of 140 ppm. The epoxy resin comprised 2% by weight of the total weight of the 3-percent Si—Fe alloy powder and epoxy resin.

(2) Solution Containing an Organic Compound

Five kinds of aqueous solutions, each having different concentrations of boron and sodium, were used for solutions containing an organic compound. Solutions whose concentrations of boron and sodium were calculated to yield oxide concentrations in the range of 60-2500 ppm and 20-400 ppm, respectively, upon oxidation as revealed by ICP spectrometry after manufacture of the magnetic core were used as the solutions containing organic compounds.

(3) Molding Conditions

Compound powder 3 containing a mixture of 2% by weight epoxy resin and 3% by weight Si—Fe was molded into the shape of a toroidal core having an outside diameter of 15 mm, and inside diameter of 10 mm and a height of 3 mm. Molding pressure was 7 t/cm$^2$.

(4) Hardening Conditions

Hardening of the molded body 4 was carried out at a temperature of 150° C.

(5) Boron Oxide and Sodium Oxide Surface Processing Conditions

The hardened body was immersed in the solution containing an inorganic compound in a glass container and a pump connected to one end of the glass container was driven so as to reduce the pressure of the air above the surface of the solution. After a predetermined period of time, the magnetic core was removed from the solution containing an inorganic compound, dried, and heated to a temperature of 140° C.

(6) Evaluation Conditions

The composite-type magnetic core 5 manufactured under the conditions described above was then exposed to a temperature of 60° C. at a relative humidity of 95% for 500 hours in a thermo-hygrostat. Thereafter, the state of rust on the surface of the composite-type magnetic core 5 was observed and the concentrations of sodium oxide and boron oxide are determined by ICP spectrometry.

COMPARATIVE EXAMPLE 1

As the solutions containing inorganic compounds, a solution whose concentrations of boron and sodium are calculated to yield oxide concentrations of 30 ppm and 8 ppm respectively, and a solution whose concentrations of boron and sodium are calculated to yield oxide concentrations of 4000 ppm and 700 ppm respectively upon oxidation as revealed by ICP spectrometry after manufacture of the magnetic cores, were used as the solutions containing an organic compound. In addition, a magnetic core that was not immersed in the solution containing an inorganic compound but was used instead in its hardened state after molding was provided for evaluation as a control. The remaining conditions, specifically, the raw materials, the molding conditions, the hardening conditions, the boron oxide and sodium oxide surface processing conditions and the evaluation conditions, were the same as those of the example 1.

Table 1 summarizes the results of the evaluations of the example 1 and the comparative example 1.

TABLE 1

| Solution No. | Carbon (ppm) | Boron oxide (ppm) | Sodium oxide (ppm) | Evaluation Results | Remarks |
|---|---|---|---|---|---|
| Unprocessed article | 140 | 0 | 0 | Red rust appears over entire surface | comparative example 1 |
| 1 | 140 | 30 | 8 | Red rust appears over entire surface | comparative example 1 |
| 2 | 140 | 60 | 20 | Red rust appears over 5% of surface | comparative example 1 |
| 3 | 140 | 200 | 30 | Red rust appears over 5% of surface | example 1 |
| 4 | 140 | 900 | 150 | Red rust does not appear | example 1 |
| 5 | 140 | 2000 | 300 | Red rust does not appear | example 1 |
| 6 | 140 | 2500 | 400 | Red rust does not appear | example 1 |

TABLE 1-continued

| Solution No. | Carbon (ppm) | Boron oxide (ppm) | Sodium oxide (ppm) | Evaluation Results | Remarks |
|---|---|---|---|---|---|
| 7 | 140 | 4000 | 700 | Red rust does not appear White deposits appear on surface after heat treatment | comparative example 1 |

As shown in TABLE 1, the composite-type magnetic cores 5 manufactured using solutions containing an inorganic compound (hereinafter simply called "solutions") Nos. 2-6 suffered rust over no more than 5% of their entire surface area. In particular, with the composite-type magnetic cores 5 manufactured using solutions No. 4, No. 5 and No. 6, the appearance of rust was not found. By contrast, rust was found over the entire surface area of the "unprocessed article" that did not use a solution as well as of the composite-type magnetic core 5 manufactured using solution No. 1. In addition, with the composite-type magnetic core 5 manufactured using solution No. 7, although the appearance of rust was not noted, white deposits were found on the surface of the magnetic core after heat treatment.

From the foregoing results, a composite-type magnetic cores 5 in which the concentration of boron oxide is 60-2500 ppm and the concentration of sodium oxide is 20-400 ppm, the boron oxide and the sodium oxide firmly cover the surface of the magnetic core and appear to contribute to improved oxidation resistance. By contrast, a composite-type magnetic cores 5 in which the concentration of boron oxide is 30 ppm or less and the concentration of sodium oxide is 8 ppm or less, the concentrations of boron oxide and sodium oxide appear to be insufficient to improve oxidation resistance.

EXAMPLE 2

(1) Raw Material

For the soft magnetic metal powder 1 and the insulating binder 2, respectively, a 3-percent Si—Fe alloy powder (that is, an alloy powder composed of 97% by weight Fe and 3% by weight Si) and an epoxy resin were used. Six types of alloy powder whose concentrations of carbon were within the range of 50-450 ppm were used for the 3% Si—Fe alloy powder. The epoxy resin comprised 2% by weight of the total weight of the 3-percent Si—Fe alloy powder and epoxy resin.

(2) Solution Containing an Organic Compound

An aqueous solution containing boron and sodium was used. Specifically, that which has concentrations of boron and sodium calculated to yield oxide concentrations of 1000 ppm and 200 ppm, respectively, upon oxidation as revealed by ICP spectrometry after manufacture of the magnetic core, was used for the aqueous solution.

The molding conditions, hardening conditions, boron oxide and sodium oxide surface processing conditions and evaluation conditions were the same as those for the example 1.

COMPARATIVE EXAMPLE 2

An alloy powder having a carbon concentration of 720 ppm was used for the 3% Si—Fe alloy powder. The remaining conditions were the same as those for the example 2. Table 2 summarizes the results of the evaluations of the example 2 and the comparative example 2.

TABLE 2

| Sample No. | Boron oxide (ppm) | Sodium oxide (ppm) | Carbon (ppm) | Evaluation Results | Remarks |
|---|---|---|---|---|---|
| 1 | 1000 | 200 | 50 | Red rust does not appear | example 2 |
| 2 | 1000 | 200 | 80 | Red rust does not appear | example 2 |
| 3 | 1000 | 200 | 140 | Red rust does not appear | example 2 |
| 4 | 1000 | 200 | 220 | Red rust does not appear | example 2 |
| 5 | 1000 | 200 | 310 | Red rust does not appear | example 2 |
| 6 | 1000 | 200 | 450 | Red rust does not appear | example 2 |
| 7 | 1000 | 200 | 720 | Red rust appears on app. 30% of surface | comparative example 2 |

As shown in TABLE 2, the composite-type magnetic cores 5 manufactured using 3-percent Si—Fe alloy powders (called "samples" here) Nos. 1-6 showed no rust on the surface area of the magnetic core. By contrast, rust appeared on approximately 30% of the surface area of the composite-type magnetic core 5 manufactured using sample No. 7.

Thus, as described above, the composite-type magnetic core and the method of manufacturing the composite-type magnetic core of the present invention fully satisfy demands for magnetic cores with high oxidation resistance and greater compactness.

As many apparently widely different embodiments of the present invention can be made without departing from the spirit and scope thereof, it is to be understood that the invention is not limited to the specific preferred embodiments described above thereof except as defined in the claims.

That which is claimed:

1. A composite-type magnetic core comprising:

soft magnetic metal powder; and an insulating binder having a lower electrical conductivity than the soft magnetic metal powder, wherein an oxidation prevention barrier comprising 10 parts per million (ppm) or more but 500 ppm or less of sodium oxide and 50 ppm or more but 3000 ppm or less of boron oxide is concentrated in an inner layer near a surface of the magnetic core.

2. The composite-type magnetic core according to claim 1, wherein the soft magnetic metal powder contains about 500 ppm or less of carbon.

3. The composite-type magnetic core according to claim 2, wherein the soft magnetic metal powder contains about 50 to 500 ppm of carbon.

4. The composite-type magnetic core according to claim 1, wherein the oxidation prevention barrier comprises about 20 to 400 ppm of sodium oxide and about 60 to 2500 ppm of boron oxide.

5. The composite-type magnetic core according to claim 1, wherein the oxidation prevention barrier further comprises a layer covering the surface of the magnetic core.

* * * * *